Oct. 21, 1969     F. A. ZUPA     3,474,367

RELAY MOTOR

Filed March 6, 1968     2 Sheets-Sheet 1

INVENTOR.
FRANK A. ZUPA
BY
F. J. Pizarra
ATTORNEY 3,474,367
RELAY MOTOR
Frank A. Zupa, New York, N.Y., assignor to Allied Control Company, Inc., New York, N.Y., a corporation of New York
Filed Mar. 6, 1968, Ser. No. 710,983
Int. Cl. H01f 7/13, 7/08
U.S. Cl. 335—274      10 Claims

ABSTRACT OF THE DISCLOSURE

A relay motor especially applicable to an electromechanical switching relay of the general type in which an armature is supported by and pivotal relative to the yoke of a relay polepiece assembly and is maintained in engagement with the yoke through the medium of a retainer spring unit. The armature, yoke and retainer spring unit of this invention are so constructed, configured and arranged that, when they are incorporated in a relay of the type indicated, the axis of rotation of the armature is maintained in predetermined fixed relation to the yoke.

BACKGROUND OF THE INVENTION

The relay motor of this invention has many applications in the field of electronics. It is applicable, by way of example, to an electro-mechanical switching relay of the general type which comprises an armature, a polepiece assembly including a yoke and an armature retainer spring, the armature being mounted on the yoke and pivotal relative thereto.

There have been a number of developments over the years in switching relays of the indicated general type. Such developments are exemplified in J. Diciolla Patent No. 3,142,735, issued July 28, 1964.

The designs and constructions of prior art relays have two inherent disadvantages which adversely affect their operating efficiency. First, the armature is permitted to slide relative to the hinging edge of the yoke in a manner to cause objectionable shifting of its axis of rotation and thereby change the ratio of displacements at the contact actuator and corresponding displacements of the armature gap. Second, the armature is permitted undesirable lateral movement relative to the yoke thereby changing the position of the contact autuator relative to the contact arms which, in turn, changes the contact gauging adjustments on the relay.

The relay motor of this invention successfully overcomes both disadvantages as will be readily understood by persons trained in the art from the detailed description that follows and the accompanying drawings.

SUMMARY OF THE INVENTION

This invention relates to the art of electromagnetic devices and, more particularly, to a relay motor having improved features of design and construction, which features result in substantial improvements in operating efficiency and mechanical life as compared to conventional relay motors of the same general type.

A relay motor according to this invention comprises support means, an electromagnet unit carried by the support means, an armature unit pivotal relative to the electromagnet unit and an armature retainer spring unit. The electromagnet unit includes a magnetizing coil, a polepiece extending through and beyond at least one end of the coil and a yoke. A part of the yoke is parallel to the coil axis and has a free end portion which is adjacent said end of the coil. The side surfaces of the yoke free end portion are preferably parallel and are spaced outwardly from the side surfaces of the next adjacent portion of the yoke. The upper edge of the end of the yoke serves as a hinging edge for the armature unit.

The armature unit includes an armature, which is positioned in spaced relation to said end of the coil; a pair of preferably parallel legs, each of which is in close proximity to corresponding one of said side surfaces; and a pair of spaced lugs which engage the hinging edge of the yoke in a manner to permit pivotal or rocking movement of the armature relative to the yoke. The armature unit is maintained in proper engagement with the yoke at all times by the retainer spring unit. This unit is generally L-shaped and includes a first flange, which is secured to the support means and is positioned on the free end portion of the yoke, and a second flange, which is spaced from the armature. Integral with and symmetrically spaced from the second flange is a pair of arms which are offset from the plane of the second flange. Each arm terminates in a bent end part that engages a corresponding armature lug.

The above-mentioned parts of the present relay motor are so constructed, configured and arranged as to successfully attain the several objectives of the invention, as will be explained in detail further along herein.

The primary object of this invention is to provide a relay motor having improved features of design and construction.

Another object of this invention is to provide a relay motor having substantially higher operating efficiency and greater mechanical life than conventional relay motors of the same general type.

The invention has for a further object the provision of a relay motor of the character indicated that is simple, compact and lightweight in design; that is sturdy and durable in construction; that is reasonable in manufacturing cost; that may be readily adjusted, as required; that is adapted to be used in conjunction with or as a part of various devices in the field of electronics, including electromechanical switching devices; and that is capable of affording efficient, dependable and trouble-free service over extended periods of time.

The enumerated objects, together with the advantages of this invention, will be evident to persons trained in the art from the following detailed description and the annexed drawings which respectively describe and illustrate a preferred and recommended form of the invention.

BRIEF DESCRIPTION OF THE DRAWINGS

In the drawings wherein like reference characters denote corresponding parts throughout the several views.

DESCRIPTION OF THE PREFERRED EMBODIMENT

Figure 1:
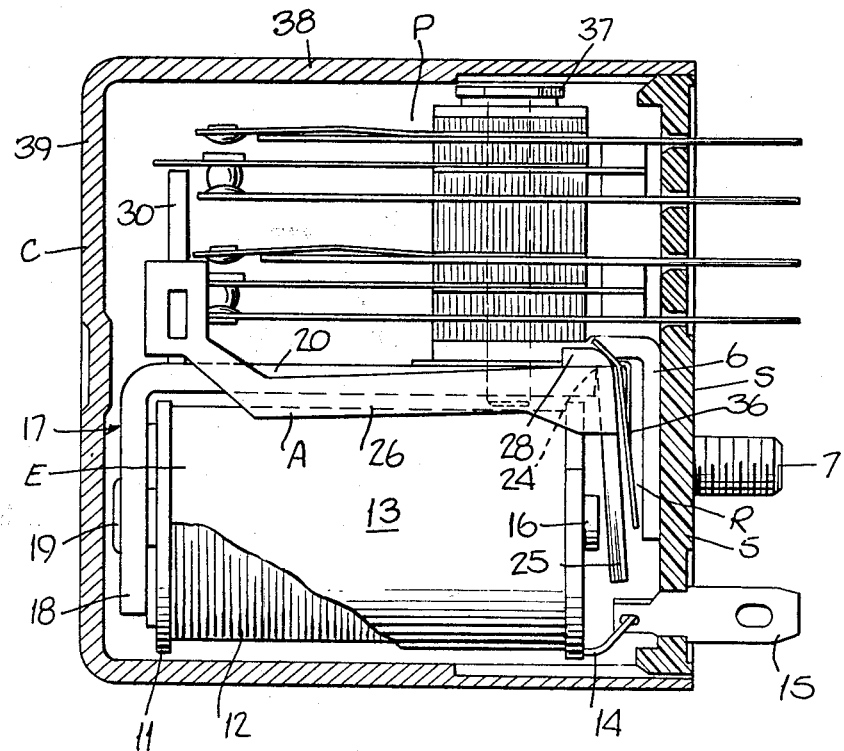
FIG. 1 is a view in central vertical cross section of a relay motor according to this invention incorporated in a 4-pole double throw electric switching relay.

Referring initially to FIG. 1 of the drawings, the electric switching relay illustrated therein is made up of six principal units, assemblies or parts, namely a support unit S, an electromagnet unit E, an armature unit A, a retainer spring unit R, a contact pile-up assembly P and a housing or cover C.

Support unit S comprises a base plate 5, an L-shaped bracket 6 and a mounting bolt 7. Base plate 5 is preferably molded from a suitable electric insulating material, such as a phenol formaldehyde resinous composition that is available commercially under the trade-name Bakelite.

Figure 4:
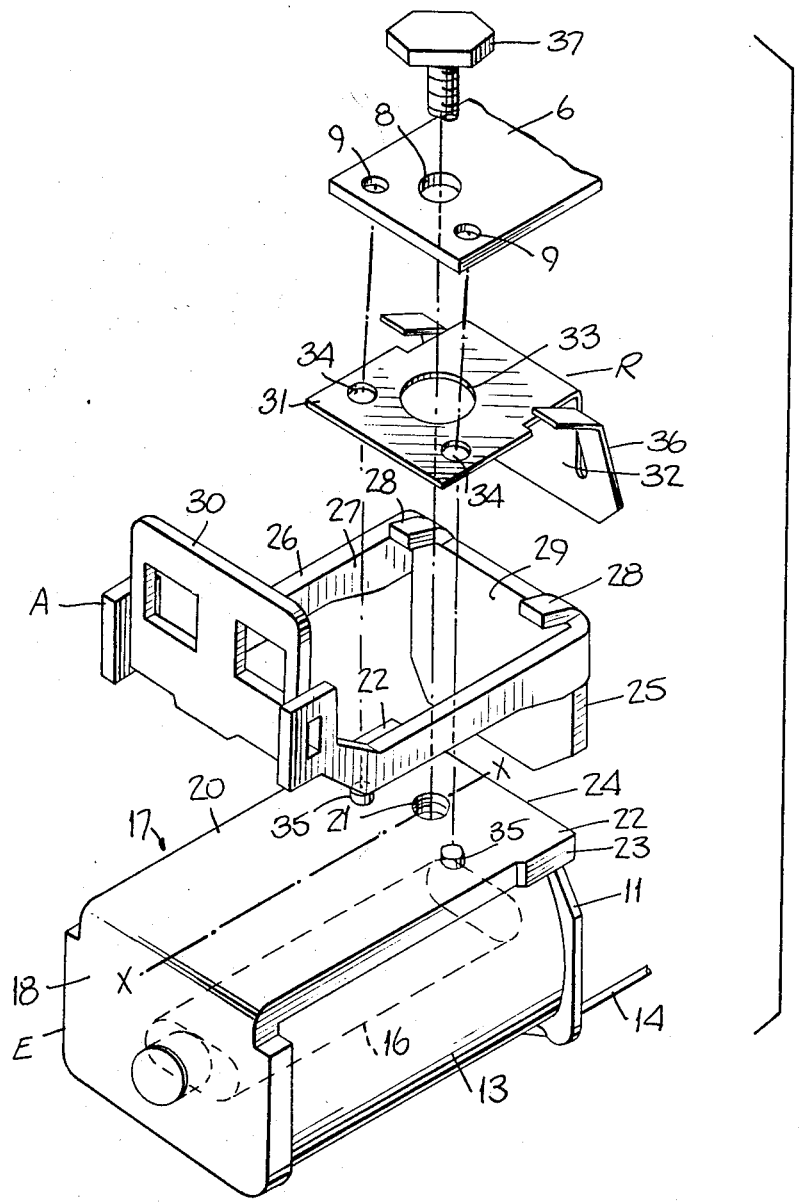
FIG. 4 is an exploded view of the relay motor shown in FIG. 1.

Bracket 6 and mounting bolt 7 are positioned to opposite sides of base plate 5 and are affixed thereto in any desired manner known to the art. The free arm of bracket 6 is formed with an opening 8 and a pair of relatively smaller openings 9 (FIG. 4). Unit S is similar to and serves the same functions as the corresponding unit disclosed in said Patent No. 3,142,735 to which reference may be had for further details.

Electromagnet unit E is best shown in FIGS. 1 and 4 and includes a bobbin 11, a magnetizing coil 12 which is wound around the bobbin and which is ensheathed in a protective outer wrap 13. The coil has a pair of electric leads, only one of which is shown and identified by numeral 14. This lead is connected, preferably by soldering, to an electric terminal 15 which is carried by base plate 5. The other lead is connected in like manner to a second electric terminal (not shown) which is also carried by the base plate. The electric terminals are adapted to be connected to a suitable source of electric energy supply (not shown). A rectilinear polepiece 16 extends through the opening defined by bobbin 11 and projects beyond both ends of the bobbin.

The electromagnet unit also includes an L-shaped yoke 17 consisting of a first arm 18, which is normal to polepiece 16 and is secured to one end of the polepiece, as indicated at 19 in FIG. 1, and the second arm 20 which is parallel to the polepiece and is provided with a through tape 21. The longitudinal center line of arm 20 is denoted by the line X—X in FIG. 4. As is best shown in that view, arm 20 is so configured that its free end portion projects a greater distance beyond opposite sides of line X—X than the remaining portion whereby to obtain a pair of lateral projections 22 having parallel side surfaces 23, only one of which is shown. The upper surface and the free end surface of arm 20 intersect along a rectilinear line 24 which constitutes a hinging edge about which armature unit A is adapted to rock or pivot relative to the yoke, as will be described in detail further along herein.

Reference is next had to FIG. 4 for an understanding of the construction of armature unit A. This unit comprises a plate type armature 25 having a pair of integral, spaced, parallel, laterally extending legs 26. Each leg 26 has an inner surface 27. At least the portions of surfaces 27 which are immediately adjacent the armature 25 are spaced apart a distance which is slightly greater than the distance between the side surfaces 23 of yoke projections 22. Accordingly, when the parts are assembled, yoke surfaces 23 are in close proximity to the corresponding portions of the inner surfaces 27 of the armature legs.

Armature 25 is formed with a pair of integral, spaced, parallel extensions or lugs 28 which project above and in the same general direction as legs 26. The undersurfaces of lugs 28 are substantially coplanar and, as will be observed from an examination of FIG. 4, define an obtuse angle with the plane of inner surface 29 of the armature. Also, the junctures of the lug undersurfaces and the armature inner surface 29 constitute parts of an imaginary line which is coincident with yoke hinging edge line 24 when the armature unit A is in operative engagement with the yoke.

Armature legs 26 carry a contact actuator 30 which is cooperatively associated with contact pile-up assembly P and which is essentially the same as that disclosed in said Patent No. 3,142,735 to which reference may be had for details of construction and function.

Figure 2:
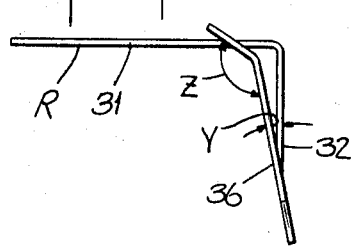
FIG. 2 is a side elevation view in enlargement of a retainer spring unit which is also shown in FIG. 1.
Figure 3:
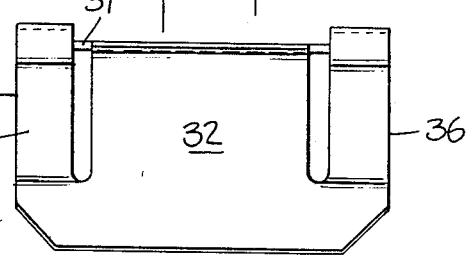
FIG. 3 is a view of the retainer spring unit taken from the right of FIG. 2.

Retainer spring unit R, which is best shown in FIGS. 2, 3 and 4, is generally L-shaped and is fabricated from a relatively thin sheet of a suitable resilient metal, such as spring temper brass. This unit comprises flanges 31 and 32. Flange 31 is provided with a first through opening 33, which is aligned with opening 8 in bracket arm 6 and tap 21 in yoke 17, and a pair of relatively small openings 34, which are aligned with corresponding openings 9 in bracket arm 6. Flange 31 is positioned on the yoke 17 by means of dowel pins 35 which protrude from leg 20 of yoke 17 and which register with corresponding aligned openings 9 and 34.

Integral with and positioned to opposite sides of flange 32 is a pair of identical, parallel and coplanar arms 36 which are offset inwardly from this flange by an acute angle Y, as indicated in FIG. 2.

Contact pile-up assembly P is of conventional design and construction and is substantially the same as the corresponding assembly appearing in said Patent No. 3,142,735 to which reference is had for details of construction and operation.

The above-described units, assemblies and parts are arranged, as shown in FIG. 1, and are united and maintained in the illustrated assembled relationship by a screw connector 37 which extends through an opening (not shown) in pile-up assembly P, opening 8 in bracket arm 6, opening 33 in retainer unit flange 31 and tap 21 in yoke 17, in the order named.

Cover unit C is made of a suitable metal or synthetic plastic composition and comprises a tubular side wall 38 which is closed at one end 39 and open at its other end to receive base plate 5 and the parts to the left of the base plate, as viewed in FIG. 1. The side wall 38 is secured to the base plate in any desired manner known to the art.

For the purpose of outlining the operation of the herein described form of the invention, it is first assumed that the illustrated relay is assembled and that the parts are in the relative position shown in FIG. 1. This is the normal deenergized condition of the relay. It will be observed that the armature unit A is mounted on yoke 17 with its legs 28 overlying the free end of part 20 and engaging its upper edge 24. The armature unit is maintained in engagement with the yoke by spring retainer unit R, as illustrated. The arms 36 of unit R exert a predetermined pressure on the underlugs 28, thereby securing desired contact between the armature and yoke edge 24 and maintaining a stable axis of rotation of the armature unit during its operating and releasing movements.

When terminals 15 are connected to a suitable source of electric supply, magnetizing coil 12 is energized and polepiece 16 exerts sufficient attracting force on armature 25 to impart clockwise rocking movement to the armature unit, as viewed in FIG. 1. The polepiece limits such clockwise rocking movement of the armature. It will be evident that the armature imparts corresponding movement to actuator 30 which, in turn, actuates elements of the contact pile-up. When the magnetizing coil is again deenergized, the parts return to the relative position shown in FIG. 1.

As was indicated earlier herein, prior related relay constructions permit the armature to slide relative to the yoke. This causes undesirable shifting of its axis of rotation and, as a consequence, changes the ratio of displacements at the contact actuator 30 and corresponding displacements of the armature gap. This condition is avoided in the present invention because the arrangement of armature lugs 28 and the application of spring pressure directly on the lugs by retainer unit spring arms 36 prevent such shifting and thereby maintain desired stability of the axis of rotation of the armature unit and the ratio of actuator to armature gap displacement.

The close proximity of yoke side surfaces 23 to corresponding surfaces 27 of the armature legs provides dual functions and benefits, namely (1) the magnetic reluctance between the armature unit and the yoke is thereby reduced and (2) the lateral displacement of the armature unit relative to the yoke is restricted and minimized, thereby preventing excessive lateral movement of actuator 30 which would cause changes in the adjustment or actuation of elements of pile-up assembly P.

The position of retainer spring unit arms 36 and their bent free ends relative to the outer surface of armature lugs 28 can be readily preset to obtain either of two conditions of the released position of the armature after it has restored contact elements of the pile-up assembly to their released position. One released condition is that in which the contact actuator 30 is held against the underlying surface of the yoke. The other released condition is that in which the contact actuator is "floating" without any rotational force. This can be accomplished by making the length of arms 36 such that the force exerted thereby on lugs 28 has a suitable finite moment arm or zero moment arm relative to yoke hinging edge 24. These features are valuable in controlling the effect that the released armature bias force has on the relay sensitivity and on the magnitude of "contact bounce" which occurs at the time the relay is deenergized.

Specimens of the herein disclosed relays have been built and thoroughly tested for operating efficiency and service life. Such tests have established that the relays are capable of functioning successfully and efficiently for more than one hundred million operations with the relays mounted in each of the three possible mounting planes or positions, i.e. mounted horizontally, as shown in FIG. 1, mounted in depending position which is 90° counter-clockwise from the position shown in FIG. 1 and mounted in upstanding position which is 90° clockwise from the position shown in FIG. 1.

From the foregoing, it is believed that the objects, advantages, construction and operation of my present invention will be readily comprehended by persons skilled in the art without further description. Although the invention has been herein shown and described in a simple and practicable form, it is recognized that certain parts thereof are representative of other parts which may be used in substantially the same manner to accomplish substantially the same results.

What is claimed is:
1. A relay motor comprising:
    (a) support means;
    (b) a horizontally arranged electromagnet coil carried by the support means;
    (c) a polepiece extending through the coil, at least one end of the polepiece projecting beyond an end of the coil;
    (d) a yoke connected to the other end of the polepiece and including a portion which extends along the coil and terminates in a free end part above said one end of the polepiece and having side surfaces and an upper edge that is substantially normal to the longitudinal axis of the coil;
    (e) an armature unit mounted on the yoke and including:
        (1) a generally upright armature adjacent said one end of the polepiece;
        (2) a pair of spaced legs secured to the armature, each leg being positioned adjacent a corresponding side surface of said free end part of the yoke; and
        (3) yoke engaging means carried by the armature and seated on said edge whereby to permit rocking movement of the armature unit relative to the yoke about said edge; and
    (f) a generally L-shaped retainer unit including:
        (1) a first flange secured to the support means and positioned adjacent said portion of the yoke;
        (2) a second flange positioned adjacent and in spaced relation to the armature; and
        (3) resilient means carried by the second flange and bearing against the yoke engaging means, said resilient means normally preventing bodily movement of the armature unit away from said edge.

2. A relay motor according to claim 1 wherein said side surfaces of said free end part of the yoke are parallel and a portion of each leg of the armature unit is parallel to a portion of the other leg and is in close proximity to the corresponding one of said side surfaces.

3. A relay motor according to claim 2 wherein the free end part of the yoke projects laterally beyond each side of the next adjacent part of the yoke.

4. A relay motor according to claim 1 wherein the yoke engaging means comprises:
    (a) a pair of spaced legs integral with the armature, extending over said free end part of the yoke and engaging said upper edge of the yoke.

5. A relay motor according to claim 1 wherein said free end part of the yoke projects laterally beyond each side of the next adjacent part of the yoke and its said side surfaces are parallel, a portion of each leg of the armature unit is parallel to a portion of the other leg and is in close proximity to the corresponding one of said side surfaces, and the yoke engaging means comprises:
    (a) a pair of spaced lugs integral with the armature, extending over said free end part of the yoke and engaging said upper edge of the yoke.

6. A relay motor according to claim 1 wherein the armature is positioned between said one end of the polepiece and said second flange of the retainer unit.

7. A relay motor according to claim 6 wherein the resilient means comprises:
    (a) a pair of spaced, generally parallel arms which are integral with said second flange of the retainer unit, each arm having a free end part that bears against the yoke engaging means.

8. A relay motor according to claim 4 wherein the resilient means comprises:
    (a) a pair of spaced, generally parallel arms which are integral with said second flange of the retainer unit, each arm having a free end part which bears against a corresponding lug.

9. A relay motor according to claim 8 wherein the armature is positioned between said one end of the polepiece and said second flange and arms of the retainer unit.

10. A relay motor according to claim 9 wherein said free end part of the yoke projects laterally beyond each side of the next adjacent part of the yoke and its said side surfaces are parallel, and a portion of each leg of the armature unit is parallel to a portion of the other leg and is in close proximity to the corresponding one of said side surfaces.

References Cited

UNITED STATES PATENTS 3,142,735   7/1964   Diciolla _____ 335—135

BERNARD A. GILHEANY, Primary Examiner

H. BROOME, Assistant Examiner